United States Patent
Zang et al.

(10) Patent No.: US 10,761,812 B2
(45) Date of Patent: Sep. 1, 2020

(54) VISUAL CODE EDITOR FOR VISUALLY DEVELOPING FEATURES IN APPLICATIONS

(71) Applicant: SAP SE, Walldorf (DE)

(72) Inventors: Thomas Zang, Singapore (SG); Xin Ye, Beijing (CN)

(73) Assignee: SAP SE, Walldorf (DE)

( * ) Notice: Subject to any disclaimer, the term of this patent is extended or adjusted under 35 U.S.C. 154(b) by 85 days.

(21) Appl. No.: 15/356,983

(22) Filed: Nov. 21, 2016

(65) Prior Publication Data

US 2018/0143809 A1 May 24, 2018

(51) Int. Cl.
  *G06F 8/33* (2018.01)
  *G06F 9/445* (2018.01)
  *G06F 8/38* (2018.01)

(52) U.S. Cl.
  CPC ............. *G06F 8/33* (2013.01); *G06F 8/38* (2013.01); *G06F 9/44526* (2013.01)

(58) Field of Classification Search
  CPC ............ G06F 3/04847; G06F 3/04842; G06F 8/34–35; G06F 8/38; G06F 8/30; G06F 8/33
  USPC ............................. 717/108–13; 715/762–763
  See application file for complete search history.

(56) References Cited

U.S. PATENT DOCUMENTS

| | | | | |
|---|---|---|---|---|
| 6,185,728 B1 * | 2/2001 | Hejlsberg | ................. | G06F 8/34 717/109 |
| 6,247,020 B1 * | 6/2001 | Minard | ..................... | G06F 8/34 |
| 6,268,852 B1 * | 7/2001 | Lindhorst | ................. | G06F 8/34 715/234 |
| 6,314,559 B1 * | 11/2001 | Sollich | ...................... | G06F 8/33 717/111 |
| 7,062,650 B2 * | 6/2006 | Robbins | ................. | G06F 21/10 713/165 |
| 7,197,739 B2 * | 3/2007 | Preston | ..................... | G06F 8/30 717/106 |
| 7,234,113 B1 * | 6/2007 | Matz | ....................... | G06F 9/451 715/738 |
| 7,665,061 B2 * | 2/2010 | Kothari | .................... | G06F 8/30 715/760 |

(Continued)

OTHER PUBLICATIONS

Mathew, B., "UI5 App With Cordova Plugins", SAP [online], Jan. 2015 [retrieved May 12, 2019], pp. 1-24.*

(Continued)

*Primary Examiner* — Todd Aguilera
(74) *Attorney, Agent, or Firm* — Sterne, Kessler, Goldstein & Fox P.L.L.C.

(57) ABSTRACT

The present disclosure generally describes computer-implemented methods, program products, and systems for providing an integrated visual code editor that generates code snippets based on input received through the graphical user interface and simultaneously displaying the generated code snippets along with a real-time preview of the runtime behavior of the code snippet through a graphical user interface. The method and system includes a novel graphical user interface of the visual code editor that is connected to a repository and can retrieve information for concurrently display to a developer of the application. The visual code editor may concurrently display a code snippet in particular area of the graphical user interface and the runtime behavior of the code snippet within another area of the graphical user interface.

15 Claims, 5 Drawing Sheets

(56) References Cited

U.S. PATENT DOCUMENTS

| | | | | |
|---|---|---|---|---|
| 8,458,605 B2* | 6/2013 | Klask | ......................... | G06F 8/38 |
| | | | | 715/762 |
| 8,707,286 B2* | 4/2014 | Schneider | ................. | G06F 8/30 |
| | | | | 717/110 |
| 8,713,520 B2* | 4/2014 | Bank | ......................... | G06F 8/38 |
| | | | | 715/234 |
| 9,772,862 B2* | 9/2017 | Wunderlich, Jr. | ........ | G06F 8/36 |
| 10,061,573 B2* | 8/2018 | Araya | ....................... | G06F 8/76 |
| 2004/0205708 A1* | 10/2004 | Kothari | .................... | G06F 8/30 |
| | | | | 717/113 |
| 2010/0153915 A1* | 6/2010 | Schneider | ................. | G06F 8/30 |
| | | | | 717/110 |
| 2011/0214078 A1* | 9/2011 | Klask | ......................... | G06F 8/38 |
| | | | | 715/763 |
| 2014/0026115 A1* | 1/2014 | Bank | ......................... | G06F 8/38 |
| | | | | 717/113 |
| 2014/0223408 A1* | 8/2014 | Wunderlich, Jr. | ........ | G06F 8/36 |
| | | | | 717/101 |
| 2015/0234642 A1* | 8/2015 | Araya | ....................... | G06F 8/51 |
| | | | | 717/137 |

OTHER PUBLICATIONS

SAP SE, "SAP Web IDE Developer Guide—What's New in Previous Releases of SAP Web IDE," Feb. 2016, 5 pages, available at https://help.hana.ondemand.com/webide/frameset.htm?84423e9dbe434ad7a96533cad37c1dc3.html.

SAP SE, "SAP Web IDE Hybrid Application Toolkit: Testing Functionality in a Browser with Cordova Facade," 1 page, available at https://help.hana.ondemand.com/webide_hat/frameset.htm?71917abbd686460aae6f28269dc98db1.html.

* cited by examiner

VISUAL CODE EDITOR FOR VISUALLY DEVELOPING FEATURES IN APPLICATIONS

FIELD OF THE INVENTION

This disclosure relates generally to code development and, in an example embodiment, to an integrated feature visual code editor that automatically generates code snippets based on user-selected functionality and properties related to the mobile feature and simultaneously displaying the generated code snippets along with the available functionality and properties of the mobile feature.

BACKGROUND

In developing features for certain applications, an application developer may generally must undertake the steps of reading development documents to understand the programming interfaces, such application programming interfaces (APIs), input parameters, and output objects, for the application, manually code the feature in a code editor, and then switch to a separate mobile feature preview facility to preview the behavior of the code. To debug the code, the developer would need to switch between the code editor and the preview facility to manually modify the code for the feature and preview the changes to the code. The developer would have to continue this process until the feature behaves as expected.

There are at least two issues with this current method of developing features. The developer must be familiar with the programming interfaces in order to properly manually code the features. Moreover, switching back and forth between the code editor and the preview facility in order to debug the manually coded features. These issues make developing features for applications time-consuming and inefficient.

SUMMARY

The present disclosure generally describes computer-implemented methods, program products, and systems for providing an integrated visual code editor that generates code snippets based on input received through the graphical user interface and simultaneously displaying the generated code snippets along with a real-time preview of the runtime behavior of the code snippet through a graphical user interface. According to one embodiment, the disclosure provides a computer-implemented method performed by the visual code editor for developing a feature for an application. The method includes providing a novel graphical user interface of the visual code editor that is connected to a repository and can retrieve information for concurrently display to a developer of the application. For example, the graphical user interface may include a first area and a second area. The second area may comprise additional sections that retrieve information and parameters related to the feature to be developed for the application and allow for the developer to provide updated values for the parameters. Accordingly, the second area may receive an input regarding the feature for the application. The feature may include at least one of a controller file, an event handler, an application plugin, and a plugin function. The visual code editor may then generate a code snippet based on the input and inject the generated code snippet into the first area of the graphical user interface. The first area may then provide a preview of a simulated runtime behavior of the code snippet. In this manner, the visual code editor may display the code snippet in the second area of the graphical user interface and the runtime behavior of the code snippet within the first area of the graphical user interface at the same time.

According to another embodiment, the disclosure describes a computer program product that provides the visual code editor for developing a feature for an application. The computer program product includes instructions that when executed may cause a processor to perform the steps of the method described above including providing a novel graphical user interface that is connected to a repository and can retrieve information for concurrently display to a developer of the application. For example the graphical user interface may include a first area and a second area. The second area may comprise additional sections that retrieve information and parameters related to the feature to be developed for the application and allow for the developer to provide updated values for the parameters. Accordingly, the second area may receive an input regarding the feature for the application. The feature may include at least one of a controller file, an event handler, an application plugin, and a plugin function. The visual code editor may then generate a code snippet based on the input and inject the generated code snippet into the first area of the graphical user interface. The first area may then provide a preview of a simulated runtime behavior of the code snippet. In this manner, the visual code editor may display the code snippet in the second area of the graphical user interface and the runtime behavior of the code snippet within the first area of the graphical user interface at the same time.

The details of one or more embodiments of the subject matter of this disclosure are set forth in the accompanying drawings and the description below. Other features, aspects, and advantages of the subject matter will become apparent from the description, the drawings, and the claims.

DETAILED DESCRIPTION

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1A:
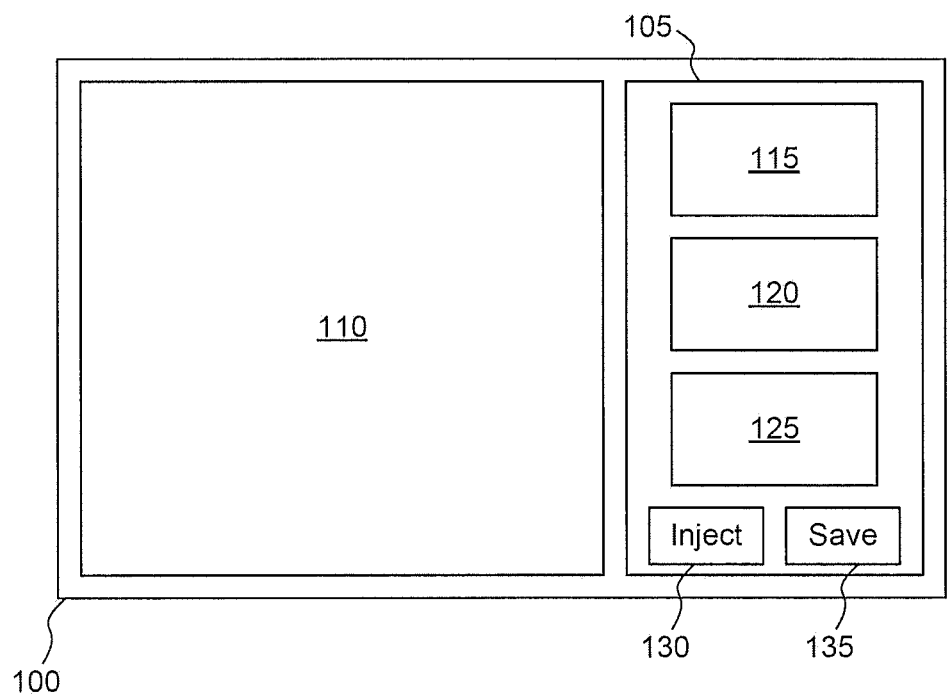
FIG. 1A illustrates an integrated feature visual code editor according to an example embodiment.

FIG. 1A illustrates an integrated feature visual code editor according to an example embodiment. In one embodiment, the visual code editor may be used to generate code snippets related to features within a Cordova mobile application development framework. The integrated feature visual code editor improves the efficiency of developing new features for an application, such as a mobile application for mobile devices within the Cordova mobile application framework. While the present disclosure may be used in particular in the development of such mobile applications, one of ordinary skill in the art would understand that the features described herein may be applicable to any type of application for which code snippets may be utilized.

According to one example embodiment, graphical user interface (GUI) 100 of the integrated feature visual code editor may be divided into separate sections for the simultaneous display of information related to generating code snippets. In one embodiment, a preview section 110 which is configured to preview runtime behavior for code snippets and a second area for generating and/or displaying the code snippets. Preview section 110 may display runtime behavior of code snippets related to a new feature that are automatically generated by the integrated feature visual code editor. The code snippets may be automatically generated based on an input received through the second area and related to at least one property of the new feature. Preview section 110 provides a simulated runtime view of the generated code snippet as if the code snippet were being executed in its traditional environment. For example, if the generated code snippet is for a mobile application, with preview section 110 of the present disclosure, the developer does not need to transfer the generated code snippet to a mobile device and execute the code. Preview section 110 allows developer to immediately simulate execution of the generated code and made any adjustments to the code snippet as will be further described below.

GUI 100 may further include a second section, which may be represented by a feature panel 105. In one embodiment, feature panel 105 provides information including selectable options related to features for the application, such as a mobile application within the Cordova framework. For example, the selectable options may include a controller file and an event handler that is related to the features that the developer wishes to develop. The controller file is related to the feature for which the developer would like to generate code snippets. The controller controls the flow of the application by receiving, processing, and returning events for the application. The controller utilizes at least one event handler to perform its functions. The event handler interfaces between the controller and events, which are typically triggered by a user action, such as an interaction with the application. A developer who wishes to add a feature into an application may select a controller file and at least one event handler for integrating the feature into the application. For example, a developer developing code for a sales application may be interested in generating code for barcode functionality. In this example, the developer may specify a controller related to the barcode and an event handler(s) for processing events related to the barcode (e.g., an onBarcodeScan event handler).

Feature panel 105 displays the available options and receives inputs from the developer. The selectable options may also include a plugin, a plugin functionality, and user-customizable properties supported by the plugin. Plugins provide an interface between the application (and its features) to native components of an operating system of a device on which the application is running. For example, the application may be a mobile application that is developed to operate on Apple devices running the iOS operating system. A plugin may therefore provide an interface between the mobile application and native components of the iOS operating system.

In the example described above, the plugin may be a barcode scan plugin (e.g., Barcodescanner plugin), the plugin functionality may be an encode/scan function that is supported by the barcode plugin, and the properties relate to input and/or output parameters supported by the encode/scan function. Although only one functionality is described here, one of ordinary skill in the art would understand that the plugin may include more than one functionality that is selectable by the developer. Moreover, one of ordinary skill in the art would understand that the disclosure is not limited to this example and that other embodiments related to different plugins, plugin functionalities, and properties are within the scope of the invention.

Feature panel 105 may be displayed adjacent to preview section 110 within GUI 100. In one embodiment, feature panel 105 and preview section 110 may be displayed in a side-by-side fashion. Regardless of the layout of panel feature 105 and preview section 110, feature panel 105 and preview section 110 are provided simultaneously within GUI 100, which allows for the information provided by both feature panel 105 and preview section 110 to be displayed concurrently to the developer.

Feature panel 105 may further comprise additional sections, application outline section 115, feature section 120, and generated snippet section 125. Application outline section 115 may display all event handlers related to the controller file that is selected by the developer. Application outline section 115 may also display user interface elements related to the selected controller file. Feature section 120 may display user-customizable properties for the selected plugin and the plugin functionality. For example, input and output properties for the selected plugin may be displayed in feature section 120. Depending on the selected plugin and functionality, the developer may be required to provide values for the properties. If the properties are input properties, the developer may provide values regarding the inputs for the plugin functionality. Alternatively, application outline section 115, feature section 120, and generated snippet section 125 may be situated in separate panels apart from each other and/or feature panel 105.

After the developer's selection of a controller file, event handler(s), plugins and plugin functionality based on the developer's interaction (e.g., providing values) with application outline section 115 and feature section 120, GUI 100 may initiate the automatic generation of a code snippet based on stored templates. The values provided by the developer are used to customize the stored code templates and the code snippets are generated based on the values and the stored code templates. The generated code snippet executes the desired features based on the developer's selections. Generated snippet section 125 may then display the generated code snippet.

Another benefit of preview section 110 and feature panel 105 is the ability to bind properties of the plugin functionality with specific user interface elements that are provided in preview section 110 and shown during simulated runtime of the code snippet. For example, if the plugin is a Barcodescanner plugin and the plugin functionality is the barcode scan functionality, preview section 110 may display a user interface element titled "search field." Concurrently, feature panel 105 may display a variable related to an output parameter of the barcode scan functionality. Through preview section 110 and feature panel 105, the developer will be able to bind the user interface element "search field" with the barcode scan output parameter such that the output parameter may automatically populate the "search field" element. The developer will be able to perform this binding step using a single screen because of preview section 110 and feature panel 105 providing this information concurrently.

GUI 100 may further include buttons 130 and 135. In one embodiment, button 130 may be an "Inject" button, which allows a developer to inject the automatically generated code snippet(s) provided in generated snippet section 125 into preview section 110. Injecting the code snippet(s) into preview section 110 results in execution of the code snippet(s) and causes the runtime behavior of the code-snippet(s) to be simulated and displayed within preview section 110.

Once injected, preview section 110 previews the runtime behavior of the generated code snippet. If the developer wishes to change the functionality of the code snippet, the developer may stay in the same GUI 100 and update the parameters displayed in application outline section 115 and mobile features panel 120 to generate a new code snippet. In this manner, displaying application outline section 115 and mobile features panel 120 concurrently allows the developer develop the feature without having to switch back and forth between different windows in order to debug the code. Moreover, the developer does not have to manually update the code snippet; integrated feature visual code editor performs his process automatically, based on the developer's selections relating to the parameters of the plugins and plugin functionality.

In one embodiment, button 135 may be a "Save" button, which allows a developer to save the generated code snippet(s) to a file, such as a the selected controller file. The developer may select button 135 once the developer has completed debugging the code snippet and is satisfied with the functionality of the code snippet as provided in preview section 110.

One of ordinary skill in the art would understand that the disclosure is not limited the above description. For example, one or more of the additional sections provided as part of feature panel 105 may be shown in a separate area of GUI 100 or may be provided as part of preview section 110.

Figure 1B:
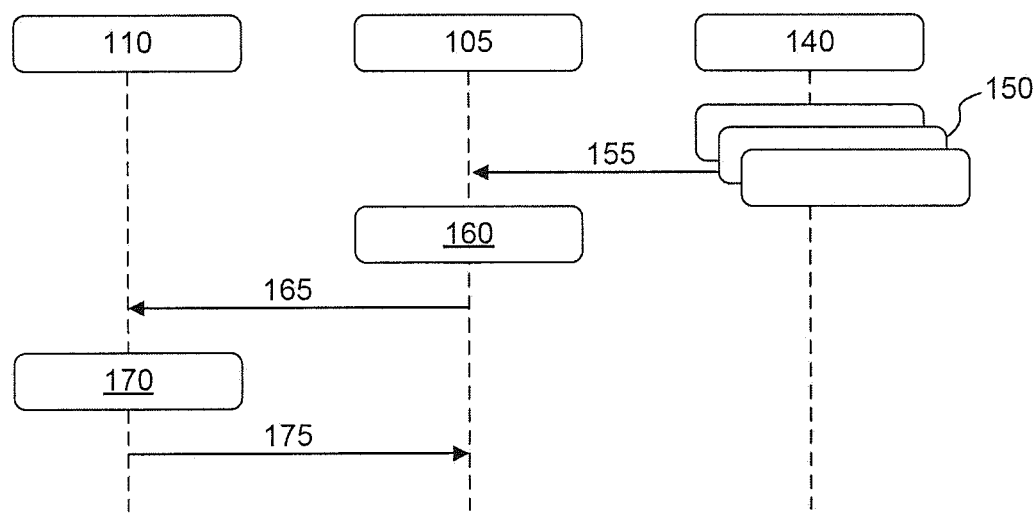
FIG. 1B illustrates steps performed by the integrated feature visual code editor according to an example embodiment.

FIG. 1B illustrates steps performed by the integrated feature visual code editor according to an example embodiment. In particular, FIG. 1B illustrates steps performed by preview section 110, feature panel 105, and plugins 140. Plugins 140 may comprise one or more plug-in features 150 that are related to the controller file selected by the developer. Plugins 150 may provide related metadata 155 for display in feature panel 105. Metadata 155 may include for example the parameters that are customizable or selectable by the developer. In one embodiment, plug-in feature 150 may be a barcode scanner plug-in, and metadata 155 may relate to parameters associated with the barcode scanner plug-in such as input or output parameters that require selection by the developer. During document services 160, feature panel 105 displays relevant metadata 155 received from plugins 140 and receives input from the developer. The input relates to the metadata 155. In document services 160, the developer provides customized information regarding metadata 155 and that is related to plug-in feature(s) 150, which allows the developer to design the code snippet that is to be generated by the integrated feature visual code editor. After generation of the code snippet within feature panel 105, the generated code snippet is displayed within generated snippet section 125 as described with regard to FIG. 1A.

Upon selection of button 130 as described with regard to FIG. 1A, feature panel 105 may perform an injection step 165 injecting the generated code snippet for runtime execution in preview section 110. At display runtime 170, preview section 110 utilizes an injected message bridge, which runs in the background, to provide a simulation of the code snippet by executing the code snippet. For example, an injected message bridge may receive the code snippet from feature panel 105 as inbound messages. The injected message bridge may generate executable code from the code snippet. After execution of the injected code snippet by the injected message bridge, preview section 110 then displays the simulated code snippet for review by the developer. Preview section 110, in step 175, may also provide messages back to feature panel 105 based on the developer's interactions with the displayed generated code snippet.

Figure 2:
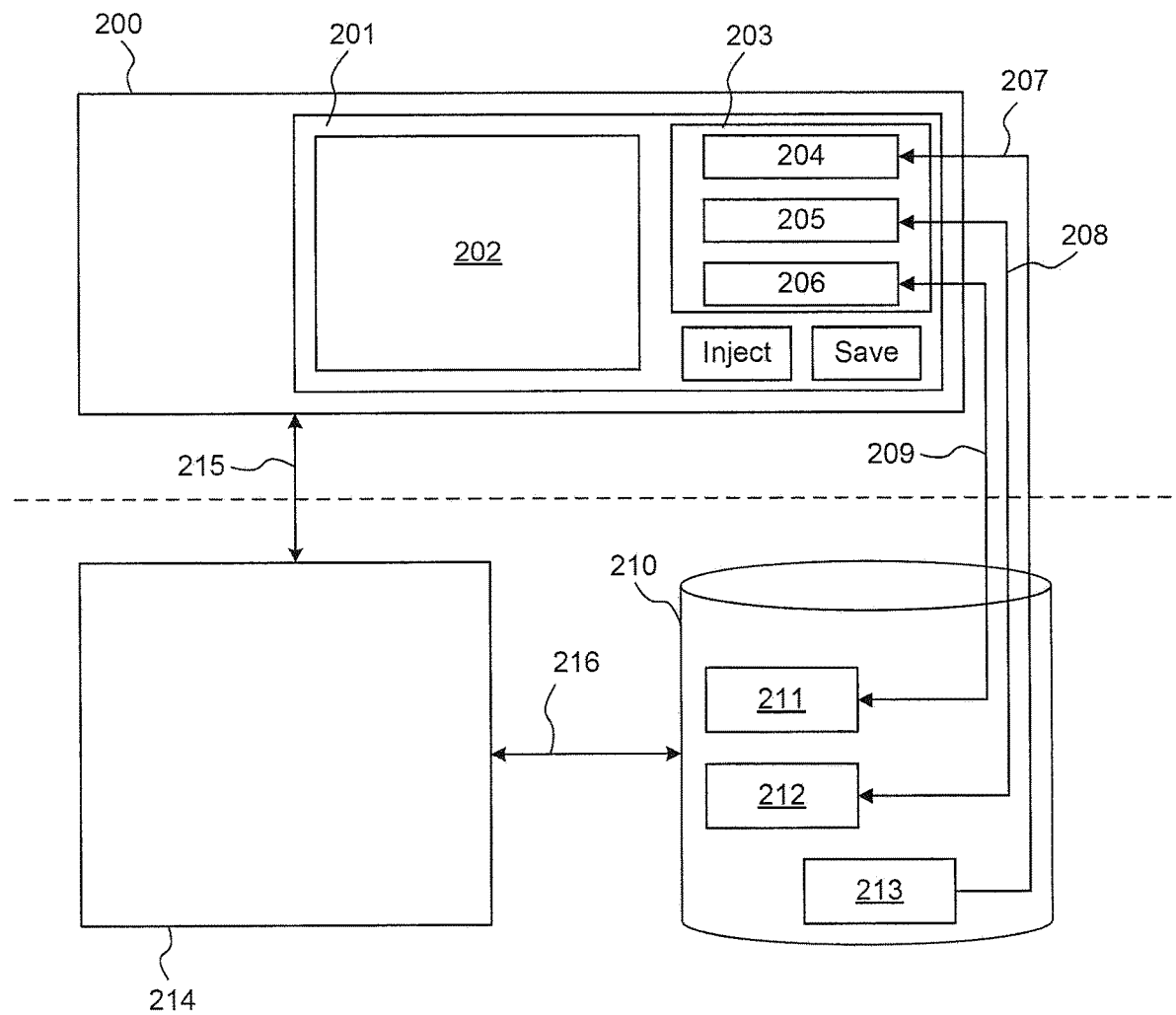
FIG. 2 shows an exemplary architecture of a system in which the integrated feature visual code editor is implemented according to an example embodiment.

FIG. 2 shows an exemplary architecture of a system in which the integrated feature visual code editor is implemented according to an example embodiment. FIG. 2 illustrates browser environment 200 that includes graphical user interface 201. In one embodiment, browser environment 200 may operate within a web integrated development environment (IDE). GUI 201 may comprise preview view 202 and a feature panel 203 that includes application outline section 204, feature section 205, and generated snippet section 206. These elements may correspond in functionality to the elements described with respect to FIG. 1A. Browser environment 200 may be connected to development environment 210, which may be implemented, in one embodiment, as a repository. In one embodiment, development environment 210 may be a cloud-based development environment.

Development environment 210 may comprise application outline database 213, mobile feature database 212, and code database 211. In other embodiments, development environment 210 may comprise a single database that performs the functions of application outline database 213, mobile feature database 212, and code database 211. Application outline section 204 may be in communication through network connection 207 with application outline database 213. Application outline database 213 may provide relevant information for display by application outline section 204, such as controller files, event handlers, and user interface elements. Feature section 205 may be in communication through connection 208 with mobile feature database 212. Mobile feature database 212 may provide information for display by feature section 205, such as items or parameters related to a plugin(s) selected by the developer. Generated snippet section 206 may be in communication through network connection 209 with code database 211. Code database 211 may store templates that can be customized to generate code snippets and may also store the generated code snippets when directed by the developer. For example, code snippets that are generated from the stored templates may be displayed within generated snippet section 206. The code snippets may be executed and the runtime behavior may be displayed in preview view 202 and/or stored in code database 211, which may also store the relevant controller files for the application. In order to concurrently display information described above (i.e., plugins, plugin functionality, parameters) within graphical user interface 201, browser environment 200 may concurrently retrieve the information from development environment 210.

FIG. 2 also illustrates cloud environment 214 in communication with browser environment 200 through network connection 216 and in communication with development environment 210. Browser environment 200 may utilize network connection 215 to store the mobile features for which code snippets are generated within cloud environment 214. The implementation of cloud environment 214 allows the mobile features to be remotely accessible to the developer and other members of the developer's team.

Figure 3:
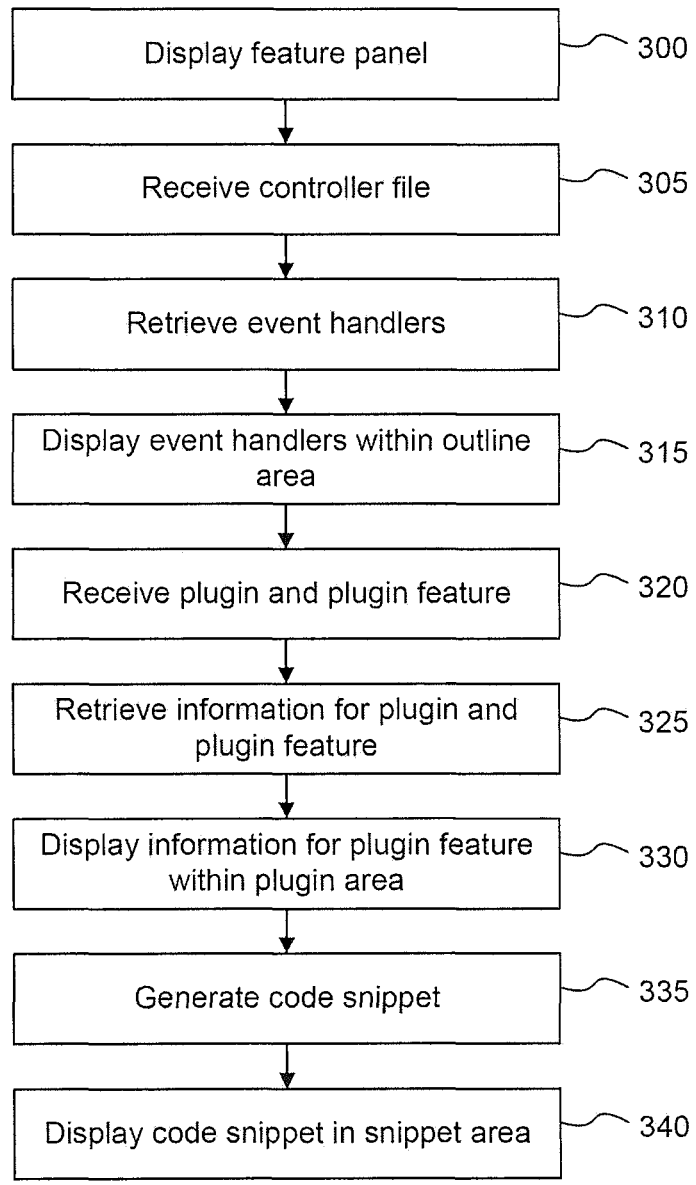
FIG. 3 shows a flow chart illustrating the steps for generating a code snippet with the integrated feature visual code editor according to an example embodiment.

FIG. 3 shows a flow chart illustrating the steps for generating a code snippet with the integrated feature visual code editor executing within a web integrated development environment (IDE) according to an example embodiment. For example, the visual code editor may be running within a browser environment and is in communication with a cloud-based platform that stores the code templates and information related to the code templates. At step 300, the integrated feature visual code editor displays a graphical user interface that includes a feature panel. At step 305, the visual code editor may then receive a selection of a controller file from the developer. Based on the received controller file, the visual code editor may then retrieve event handlers related to the controller file at step 310. Next, at step 315, the visual code editor may then display the retrieved event handlers, in for example, the application outline area of the visual code editor. The developer may next select a plugin(s) and a plugin feature(s) for which he would like to generate code snippets. At 320, the visual code editor may receive the selected by the developer. At 325, information related to the plugin(s) and their associated plugin feature(s) may be retrieved from a database based on the selected controller file and then displayed within a features section of the visual code editor. The visual code editor may then concurrently display the information related to the plugin(s) and their associated plugin feature(s) within a features area of the visual code editor at step 330. Based on the selected controller file, selected plugin, selected plugin functionality, the visual code editor may retrieve a stored code template. After receiving inputs from the developer, the visual code editor may then automatically generate code snippet(s) based on the retrieved code template and values provided by the developer during the design of the code time at step 335. The visual code editor may then display the automatically generated code snippet(s) within a snippet area of the visual code editor at step 340.

Figure 4:
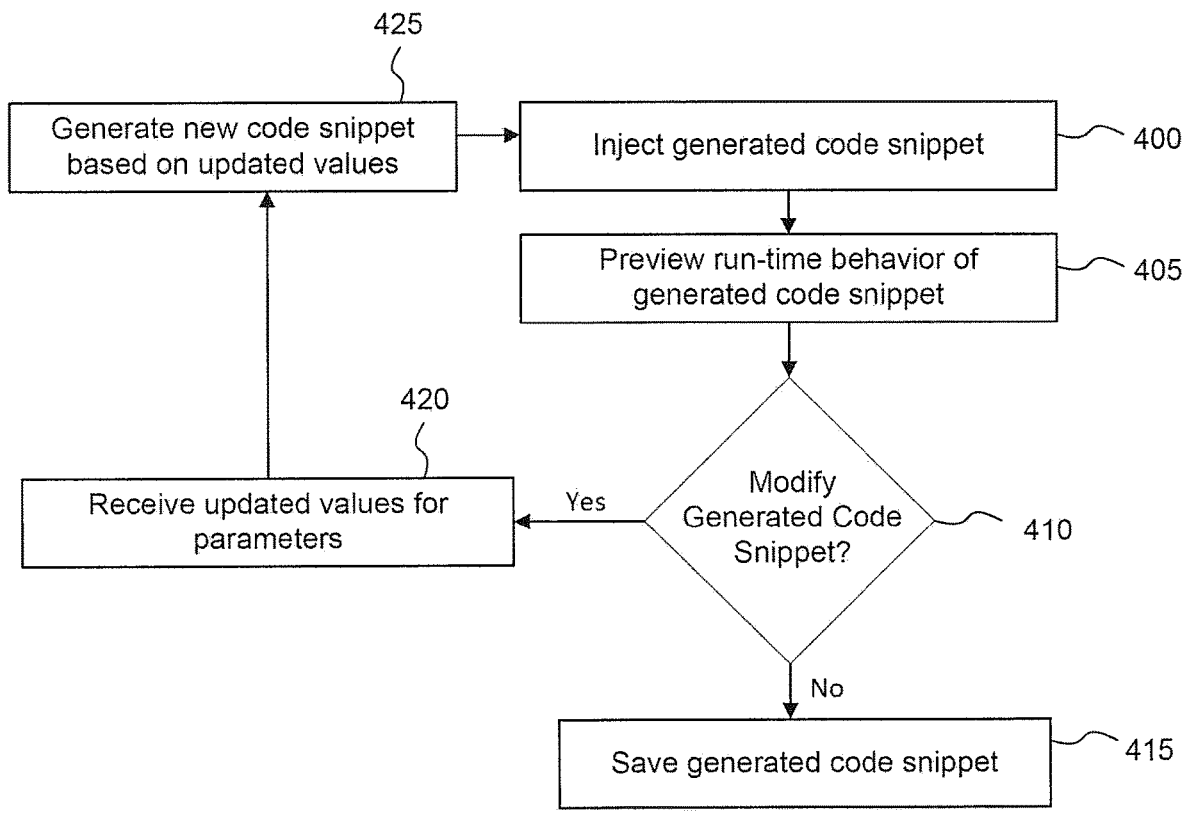
FIG. 4 shows a flow chart illustrating the steps for previewing a code snippet with the integrated feature visual code editor according to an example embodiment.

FIG. 4 shows a flow chart illustrating the steps for previewing, modifying (if necessary), and saving a code snippet with the integrated feature visual code editor according to an example embodiment. After the visual code editor generates a code snippet as discussed above with respect to FIG. 3, the visual code editor provides the developer with an option to preview the generated code snippet within the same GUI. In one embodiment, the visual code editor provides a button that is selectable by the developer that injects the generated code snippet from the snippet area of the visual code editor to a preview section of the visual code editor. The snippet area and the preview section are visible within the same GUI. In one embodiment, the snippet area and the preview section are adjacent. At step 400, the visual code editor receives a command from the developer to preview the runtime behavior of the generated code snippet. The visual code editor may then inject the generated code snippet into the preview section. At step 405, preview section simulates the runtime behavior of the generated code snippet. Based on the developer's review of simulated runtime behavior of the generated code snippet, at 410 the developer decides if it is necessary to update the code to change the runtime behavior. If the developer does not need to make any updates to the code, the developer may indicate to the visual code editor to save the generated code snippet within a repository. At step 415, based on the developer's indication, the visual code editor may store the generated code snippet. In one embodiment, the generated code snippet may be stored within the selected controller file.

If the developer decides it is necessary to update the code, the developer may make additional changes to the parameters related to the selected plugin functionality. At step 420, the visual code editor may receive these updated parameters through the features area of the visual code editor. At step 425, after the developer has completed updating the relevant parameters, the visual code editor may then generate a new code snippet based on the update values of the parameters provided by the developer. The visual code editor may then repeat the injection steps with the new generated code snippet.

Further, operation of the disclosed embodiments has been described in the context of servers and terminals that implement storage apparatus such as databases. These systems can be embodied in electronic devices or integrated circuits, such as application specific integrated circuits, field programmable gate arrays and/or digital signal processors. Alternatively, they can be embodied in computer programs that execute on personal computers, notebook computers, tablets, smartphones or computer servers. Such computer programs typically are stored in physical storage media such as electronic-, magnetic- and/or optically-based storage devices, where they may be read to a processor, under control of an operating system and executed. And, of course, these components may be provided as hybrid systems that distribute functionality across dedicated hardware components and programmed general-purpose processors, as desired.

The foregoing description has been presented for purposes of illustration and description. It is not exhaustive and does not limit embodiments of the disclosure to the precise forms disclosed. Modifications and variations are possible in light of the above teachings or may be acquired from the practicing embodiments consistent with the disclosure. For example, some of the described embodiments may include software and hardware, but some systems and methods consistent with the present disclosure may be implemented in software or hardware alone. Additionally, although aspects of the present disclosure are described as being stored in memory, this may include other computer readable media, such as secondary storage devices, for example, hard disks, floppy disks, or CD ROM; the Internet or other propagation medium; or other forms of RAM or ROM.

The disclosure is also directed to computer program products comprising software stored on any computer useable medium. Such software, when executed in one or more data processing devices, causes data processing device(s) to operate as described herein. Embodiments of the disclosure employ any computer useable or readable medium, known now or in the future. Examples of computer useable mediums include, but are not limited to, primary storage devices (for example, any type of random access memory), secondary storage devices (for example, hard drives, floppy disks, Compact Disc Read-Only Memory (CD-ROM) disks, Zip disks, tapes, magnetic storage devices, optical storage devices, Microelectromechanical Systems (MEMS), or nanotechnological storage device.), and communication mediums (for example, wired and wireless communications networks, local area networks, wide area networks, or intranets).

Based on the teachings contained in this disclosure, it will be apparent to persons skilled in the relevant art(s) how to make and use the disclosure using data processing devices, computer systems, and/or computer architectures other than that shown in FIG. 4. In particular, embodiments may operate with software, hardware, and/or operating system implementations other than those described herein.

Figure 5:
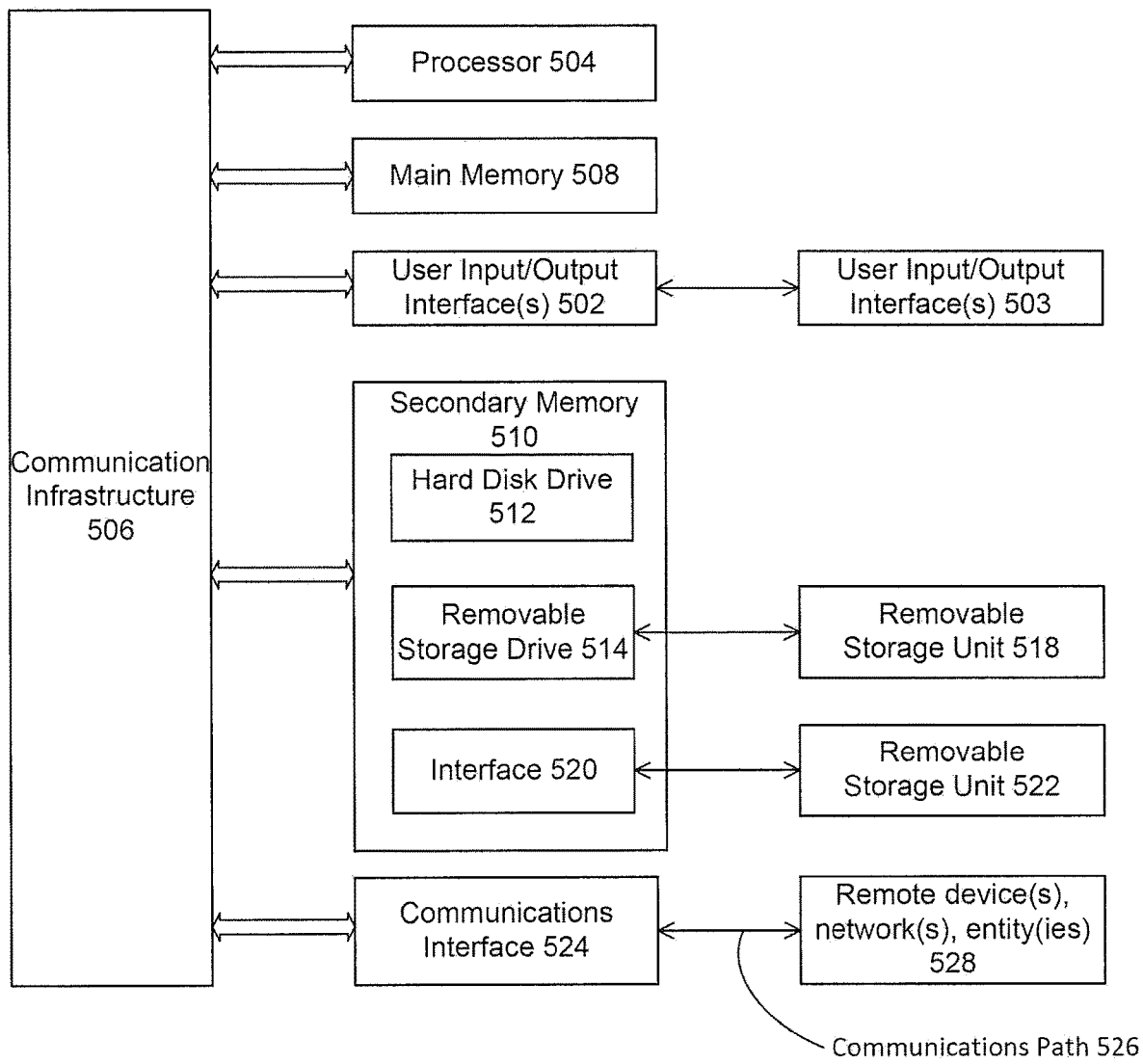
FIG. 5 shows an is an example computer system useful for implementing various embodiment.

Various embodiments can be implemented, for example, using one or more computer systems, such as computer system 500 shown in FIG. 5. Computer system 500 can be used, for example, to implement the method illustrated in FIG. 3 and/or the method illustrated in FIG. 4. Computer system 500 can be any computer capable of performing the functions described herein.

Computer system 500 can be any well-known computer capable of performing the functions described herein.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those skilled in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive. In addition, in the foregoing Detailed Description, various features may be grouped or described together for the purpose of streamlining the disclosure. This disclosure is not to be interpreted as reflecting an intention that all such features are required to provide an operable embodiment.

What is claimed is:

1. A computer-implemented method, comprising:
   providing a graphical user interface, the graphical user interface comprising a preview section and a feature panel, wherein the feature panel is configured to display a code snippet for providing a feature for an application and the preview section is configured to preview a runtime behavior of the code snippet;
   selecting a controller file and a plug-in associated with the feature, wherein the controller file handles an event for the application, and wherein the plug-in provides selectable metadata associated with the feature;
   responsive to selecting the controller file:
      selecting an event handler, wherein the event handler provides an interface between the controller file and the event;
      displaying the selectable metadata associated with the plug-in; and
      receiving a value associated with the selectable metadata;
   generating the code snippet based on the controller file, the event handler, and the value;
   displaying the code snippet in the feature panel of the graphical user interface;
   injecting the code snippet into the preview section of the graphical user interface,
   simulating the runtime behavior of the code snippet based on the injected code snippet;
   displaying the runtime behavior of the code snippet within the preview section of the graphical user interface;
   retrieving a plugin function associated with the plugin, wherein the plugin function is retrieved from a repository;
   displaying plugin information related to the plugin function in the feature panel of the graphical user interface, wherein prior to generating the code snippet:
      retrieving a code template from the repository based on the controller file, the plugin, and the plugin function, wherein the code snippet is generated based on the controller file, the event handler, the value, and the code template.

2. The method of claim 1, further comprising:
   retrieving the event handler from a repository; and
   displaying an outline information related to the event handler in an outline section of the graphical user interface.

3. The method of claim 2, wherein the outline section displays user interface elements associated with the controller file.

4. The method of claim 1, wherein the selectable metadata includes an input parameter supported by the plugin function.

5. The method of claim 1, wherein the value is received through an input from the feature panel of the graphical user interface.

6. The method of claim 1 further comprising:
   saving the code snippet in an updated controller file; and
   storing the updated controller file in a repository connected to the graphical user interface.

7. A non-transitory computer-program product for developing features for an application, the computer program product comprising computer-readable instructions, the instructions when executed by a processor cause the processor to:
   provide a graphical user interface, the graphical user interface comprising a preview section and a feature panel, wherein the feature panel is configured to display a code snippet for providing the feature for the application and the preview section is configured to preview a runtime behavior of the code snippet;
   select a controller file and a plug-in associated with the feature, wherein the controller file handles an event for the application, and wherein the plug-in provides selectable metadata associated with the feature, wherein the selectable metadata includes an input parameter supported by the plugin function;
   responsive to selecting the controller file:
      select an event handler, wherein the event handler provides an interface between the controller file and the event;
      display the selectable metadata associated with the plug-in; and
      receive a value associated with the selectable metadata;
   generate a code snippet based on the controller file, the event handler, and the value;
   display the code snippet in the feature panel of the graphical user interface;
   inject the code snippet into the preview section of the graphical user interface,
   simulate the runtime behavior of the code snippet based on the injected code snippet;
   display the runtime behavior of the code snippet within the preview section of the graphical user interface;
   retrieve a plugin function associated with the plugin, wherein the plugin function is retrieved from a repository;
   display plugin information related to the plugin function in the feature panel of the graphical user interface, wherein prior to generating the code snippet:
      retrieve a code template from the repository based on the controller file, the plugin, and the plugin function, wherein the code snippet is generated based on the controller file, the event handler, the value, and the code template.

8. The non-transitory computer-program product of claim 7, wherein the feature is associated with a plugin function.

9. The non-transitory computer-program product of claim 7, wherein the feature panel comprises at least one of an outline section, a feature section, and a snippet section.

10. The non-transitory computer-program product of claim 7, further comprising instructions when executed by the processor cause the processor to:
   retrieve the event handler from a repository; and
   display an outline information related to the event handler in an outline section of the graphical user interface.

11. The non-transitory computer-program product of claim 7, further comprising instructions when executed by the processor cause the processor to:

save the code snippet in an updated controller file; and
  store the updated controller file in a repository connected to the graphical user interface.

12. A system for developing a feature for an application comprising:

a memory configured to store metadata related to the feature; and
  at least one hardware processor coupled to the memory and configured to:
    provide a graphical user interface, the graphical user interface comprising a preview section and a feature panel, wherein the feature panel is configured to display a code snippet for providing the feature for the application and the preview section is configured to preview a runtime behavior of the code snippet;
    select a controller file and a plug-in associated with the feature, wherein the controller file handles an event for the application, and wherein the plug-in provides selectable metadata associated with the feature;
    responsive to selecting the controller file:
      select an event handler, wherein the event handler provides an interface between the controller file and the event;
      display the selectable metadata associated with the plug-in; and
      receive a value associated with the selectable metadata;
    generate a code snippet based on the controller file, the event handler, and the value;
    display the code snippet in the feature panel of the graphical user interface;
    inject the code snippet into the preview section of the graphical user interface,
    simulate the runtime behavior of the code snippet based on the injected code snippet;
    display the runtime behavior of the code snippet within the preview section of the graphical user interface;
    retrieve a plugin function associated with the plugin, wherein the plugin function is retrieved from a repository;
    display plugin information related to the plugin function in the feature panel of the graphical user interface, wherein prior to generating the code snippet:
      retrieve a code template from the repository based on the controller file, the plugin, and the plugin function, wherein the code snippet is generated based on the controller file, the event handler, the value, and the code template.

13. The system of claim 12, wherein the hardware processor is further configured to:

retrieve the event handler from a repository; and
  display an outline information related to the event handler in an outline section of the graphical user interface.

14. The system of claim 12, wherein the feature includes the event handler, the hardware processor is further configured to:

retrieve a plugin function based on the user selection, wherein the plugin function is retrieved from a repository; and
  display plugin information related to the plugin function in the feature panel of the graphical user interface.

15. The system of claim 14, wherein the selectable metadata includes an input parameter supported by the plugin function.

\* \* \* \* \*